(12) United States Patent
Woelki et al.

(10) Patent No.: US 11,966,230 B1
(45) Date of Patent: Apr. 23, 2024

(54) DISENGAGEMENT PREDICTION FOR VEHICLES

(71) Applicant: Zoox, Inc., Foster City, CA (US)

(72) Inventors: Greg Woelki, San Francisco, CA (US); Kai Zhenyu Wang, Foster City, CA (US); Bertrand Robert Douillard, Palo Alto, CA (US); Michael Haggblade, El Dorado Hills, CA (US); James William Vaisey Philbin, Palo Alto, CA (US)

(73) Assignee: ZOOX, INC., Foster City, CA (US)

( * ) Notice: Subject to any disclaimer, the term of this patent is extended or adjusted under 35 U.S.C. 154(b) by 237 days.

(21) Appl. No.: 17/125,388

(22) Filed: Dec. 17, 2020

(51) Int. Cl.
| | |
|---|---|
| G05D 1/02 | (2020.01) |
| B60W 60/00 | (2020.01) |
| G05D 1/00 | (2006.01) |
| G06N 7/01 | (2023.01) |
| G06N 20/00 | (2019.01) |
| G06V 20/58 | (2022.01) |

(52) U.S. Cl.
CPC ....... *G05D 1/0221* (2013.01); *B60W 60/0027* (2020.02); *B60W 60/005* (2020.02); *G05D 1/0214* (2013.01); *G05D 1/0231* (2013.01); *G05D 1/0276* (2013.01); *G06N 7/01* (2023.01); *G06N 20/00* (2019.01); *G06V 20/58* (2022.01); *B60W 2420/42* (2013.01); *B60W 2554/4026* (2020.02); *B60W 2554/4029* (2020.02); *B60W 2554/404* (2020.02); *B60W 2556/10* (2020.02); *B60W 2556/45* (2020.02); *G05D 2201/0213* (2013.01)

(58) Field of Classification Search
CPC .. G05D 1/0221; G05D 1/0214; G05D 1/0231; G05D 1/0276; G05D 2201/0213; G06N 20/00; G06N 7/005; B60W 60/005; B60W 60/0027; B60W 2556/10; B60W 2554/4026; B60W 2554/4029; B60W 2556/45; B60W 2554/404; B60W 2420/42; G06V 20/58
See application file for complete search history.

(56) References Cited

U.S. PATENT DOCUMENTS

| | | | |
|---|---|---|---|
| 11,110,932 B2 * | 9/2021 | Hummelshøj | G08G 1/0116 |
| 2020/0257308 A1 * | 8/2020 | Herman | G05D 1/0255 |
| 2021/0197720 A1 * | 7/2021 | Houston | G06N 3/045 |
| 2022/0065656 A1 * | 3/2022 | Young | B60W 60/0059 |

\* cited by examiner

*Primary Examiner* — Redhwan K Mawari
(74) *Attorney, Agent, or Firm* — Lee & Hayes P.C.

(57) ABSTRACT

Techniques for determining a prediction probability associated with a disengagement event are discussed herein. A first prediction probability can include a probability that a safety driver associated with a vehicle (such as an autonomous vehicle) may assume control over the vehicle. A second prediction probability can include a probability that an object in an environment is associated the disengagement event. Sensor data can be captured and represented as a top-down representation of the environment. The top-down representation can be input to a machine learned model trained to output prediction probabilities associated with a disengagement event. The vehicle can be controlled based the prediction probability and/or the interacting object probability.

20 Claims, 6 Drawing Sheets

DISENGAGEMENT PREDICTION FOR VEHICLES

BACKGROUND

Autonomous vehicles can traverse an environment without input from a human driver. In some cases, a safety driver may observe the behavior of the vehicle and may intervene to take over the control of the vehicle. However, such disengagement events are difficult to predict, and it may be difficult to understand why such a disengagement event occurred.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
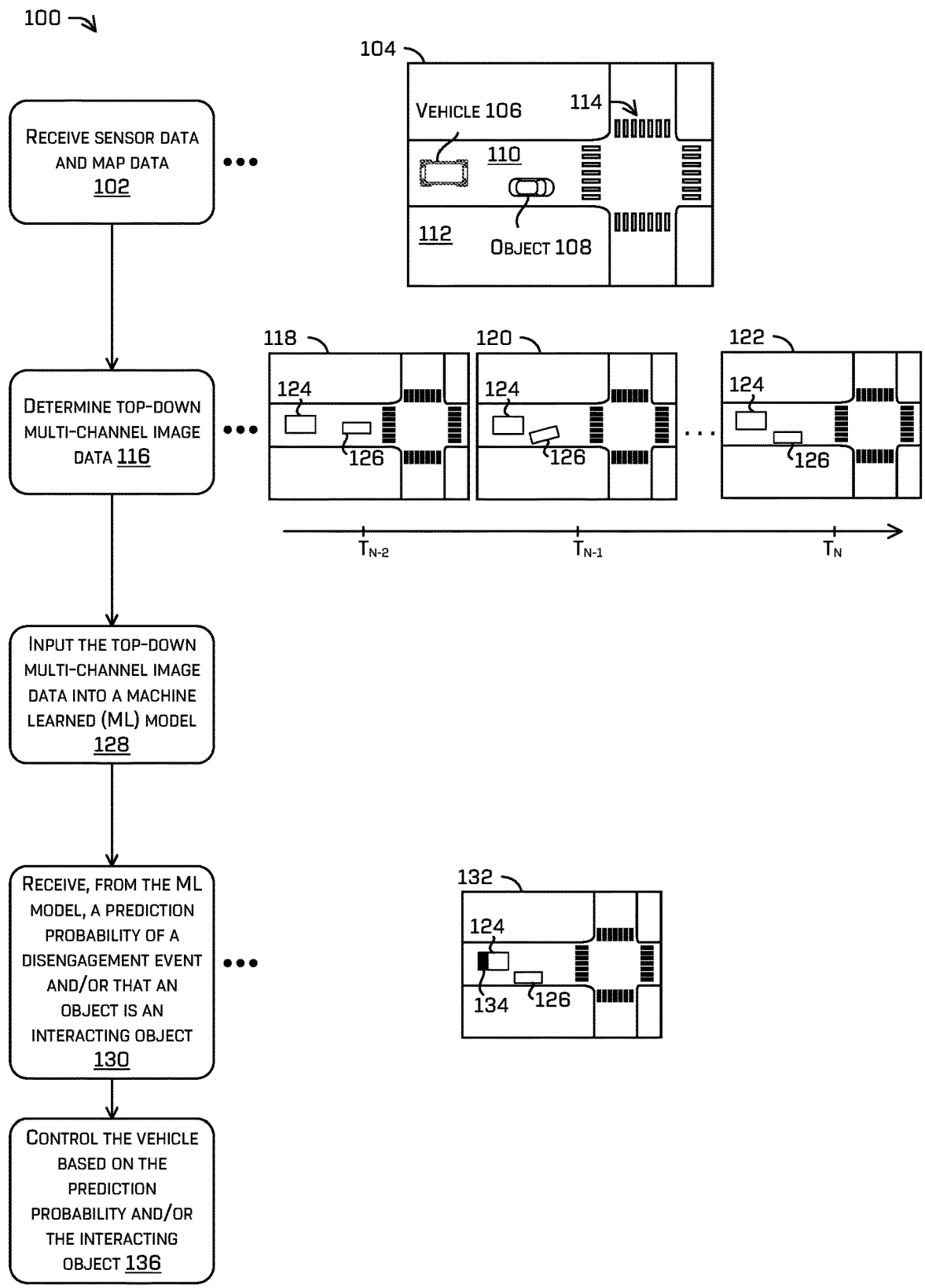
FIG. 1 is a pictorial flow diagram of an example process for determining a prediction probability of a disengagement event and/or that an object is an interacting object, in accordance with examples of the disclosure.

Techniques for determining a prediction probability associated with a disengagement event are discussed herein. The prediction probability can be determined based on a top-down representation of an environment. For example, sensors of a vehicle (such as an autonomous vehicle) can capture sensor data of an environment, which can include objects such as other vehicles or pedestrians. The sensor data can be combined with map data associated with the environment. An image representing the environment from a top-down perspective can be generated based on the sensor data and the map data. Each of the vehicle and an object in the environment can be represented by a bounding box (or some other representation). Each of the vehicle and the object can be associated with movement represented by movement information in the top-down image data. In some examples, a machine learned model can determine, based on the top-down image data, a prediction probability of a disengagement event associated with the vehicle. Additionally or alternatively, the machine learned model can determine a probability indicative of an object in the environment being associated with (e.g., a cause of) the disengagement event. The vehicle can be controlled based the prediction probability and/or the interacting object probability.

In some cases, the machine learned model can be utilized to determine the probabilities by generating deep machine learned model features associated with the environment. The deep machine learned model features can be output to multi-layer dense networks. The deep machine learned model features can be utilized to encode information associated with the objects in the environment. The deep machine learned model features output by a multi-layer dense network can be input into softmax encoders. The softmax encoders can encode information associated with the objects in the environment based on the deep machine learned model features. The encoded information output from the softmax encoders can be utilized to determine the prediction probability and/or the interacting object probability.

In some examples, the machine learned model can determine a prediction probability associated with the disengagement event (e.g., a probability that a safety driver may need to assume control over the autonomous vehicle) and/or that the object is an interacting object (e.g., a probability indicative that the object is associated with or is a cause of the disengagement event). The prediction probability and/or the interacting object probability can be provided to a planning system of the vehicle. In some examples, some or all of the possible probabilities and/or their corresponding uncertainties can be output to such a planning system. For example, the planning system (or other system) can vary a trajectory of the vehicle based on the interacting object (e.g., to increase a distance between the vehicle and the interacting object). The vehicle can be controlled based on a predicted trajectory determined by the planning system, based on the prediction probability and/or the interacting object probability.

The techniques discussed herein can improve a functioning of a computing device in a number of additional ways. In some cases, representing the environment and the object(s) in the environment as a top-down view (e.g. image) can represent a simplified representation of the environment for the purposes of generating the prediction probability associated with the disengagement event and/or that the object is the interacting object. For example, one or more top-down views (e.g., image(s)) can be displayed by one or more emitters of the vehicle and/or by one or more emitters of one or more remote computing devices. In some cases, the image can represent the environment without extracting particular features of the environment, which may simplify the generation of the prediction system and subsequent generation of the at least one predicted trajectory. In some cases, generating the prediction probability associated with the disengagement event and/or that the object is the interacting object can be provided to a planner system of an autonomous vehicle, which may allow the autonomous vehicle to more accurately and/or safely disengage automated control for the vehicle. By more accurately and/or safely disengaging automated control for the vehicle, potentially dangerous, hazardous, or unsafe conditions in an environment can be avoided. In some case, the automated control can be disengaged to avoid unexpected or confusing delays related to controlling the autonomous vehicle through unpredictable scenarios. The autonomous vehicle can be controlled by a teleoperator to more effectively maneuver around, or yield to, objects in the environment.

In some cases, the prediction probability associated with the disengagement event and/or that the object is the interacting object can be utilized to perform a call to a human operator via a teleoperator system to get input and determine a safe corridor for a portion of the environment, such as a construction zone. The teleoperator can receive advanced notice that help is required, which can provide a smoother transition of control of the vehicle, to the teleoperator. The prediction probability and/or the interacting object probability can be utilized to disengage automated control of the autonomous vehicle. In some examples, an autonomous vehicle can then be controllable by a teleoperator to smoothly navigate through the environment. By utilizing the prediction probability and/or the interacting object probability to disengage the automated control, jerkiness associated with control of the autonomous vehicle can be reduced or avoided.

In some cases, the machine learned model can be used in a simulation to more accurately evaluate behavior of a vehicle controller. For example, the machine learned model can evaluate simulated vehicle behavior to determine unsafe scenarios and/or scenarios that would have resulted in a disengagement. The simulated vehicle behavior can be represented in a top-down view (e.g., an image displayed by the emitter(s)).

In some cases, the prediction probability and/or the interacting object probability can be utilized to identify causes of disengagements. A machine learned model can analyze the prediction probability and/or the interacting object probability to determine a likelihood of a cause of a disengagement. In some examples, the machine learned model can determine the likelihood by analyzing a scene or road geometry and/or other objects in a scene. The machine learned model can determine labeled data associated with the analyzed prediction probability and the analyzed interacting object probability. Large amounts of the labeled data can be leveraged along with other available data regarding causes of the disengagements, to more accurately determine the prediction probability of a disengagement event and/or that an object is an interacting object.

The techniques described herein can be implemented in a number of ways. Example implementations are provided below with reference to the following figures. Although applicable to vehicles, such as autonomous vehicles, the methods, apparatuses, and systems described herein can be applied to a variety of systems and are not limited to autonomous vehicles. In another example, the techniques can be utilized in an aviation or nautical context, or in any system configure to input data to determine movement associated with objects in an environment. Additionally, the techniques described herein can be used with real data (e.g., captured using sensor(s)), simulated data (e.g., generated by a simulator), or any third of the two.

FIG. 1 is a pictorial flow diagram of an example process 100 for determining a prediction probability of a disengagement event and/or that an object is an interacting object, in accordance with examples of the disclosure.

An operation 102 can include receiving, by a vehicle, data associated with an environment through which the vehicle is travelling. The data associated with the environment can include road and/or lane features. The data can include data associated with objects in the environment. Each of the objects can represent another vehicle, a pedestrian, a bicycle, etc. In some cases, the vehicle (e.g., illustrated in example 104 as a vehicle 106) can be operated with control being automated. The vehicle can be partially or fully autonomously controlled. For example, the vehicle can be an autonomous vehicle, such as, an autonomous vehicle configured to operate according to a Level 5 classification issued by the U.S. National Highway Traffic Safety Administration. The Level 5 classification describes a vehicle capable of performing all safety critical functions for the entire trip, with the driver (or occupant) not being expected to control the vehicle at any time. In such an example, since the vehicle can be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled. Additional details associated with the vehicle are described throughout this disclosure.

The data associated with the environment can include sensor data and/or map data. The sensor data can be captured by a perception system of the vehicle. The sensor data can be used to determine one or more of a bounding box associated with an object (e.g. another vehicle), velocity and/or acceleration information associated with the object, classification information associated with the object, and the like. The sensor data can be captured by one or more sensors on the vehicle. In some examples, the sensor data can be captured by one or more remote sensors, such as sensors associated with the object, sensors mounted in the environment, or the like. For example, the sensor data can include data captured by one or more of a lidar sensor, a radar sensor, an image sensor, a time of flight sensor, a sonar sensor, and/or any other sensor associated with the vehicle, the object, and/or the environment. In at least some examples, additional environmental data can be received (e.g., map data of the environment encoding portions such as lanes, reference lines, crosswalks, traffic devices and/or signs, and the like).

The map data can be accessed and received based on the environment being determined by localizing the autonomous vehicle within the environment. For example, map data can comprise map elements such lane marking, lane boundaries, one or more lane references (e.g., a centerline associated with a lane and/or a route between available (e.g., legal) lanes). Additional examples of map elements can include, but are not limited to, one or more of a lane element, a bike lane element, a crosswalk element, an intersection element, a lane divider element, a traffic light element, a stop sign element, a stop line element, a yield sign element, a yield line element, a parking lane element, a driveway element, a speed bump element, jay walking regions (e.g., a virtual crosswalk), trajectory waypoints (e.g., known trajectories), passenger pickup points, a sign location element, a geofence element, and the like.

An example 104 illustrates an environment including the vehicle (e.g., vehicle 106) and another object (e.g., object 108). The vehicle 106 and/or the object 108 can be traversing the environment. The environment associated with the vehicle 106 can be determined by localizing the vehicle 106 in the environment. The environment can include a drivable region 110, a non-drivable region 112, and an intersection 114.

A planned route associated with the vehicle 106 at a location can be determined, based on sensor data and/or the map data. The vehicle 106 and the object 108 can be located in the drivable region 110. The planned route can include the vehicle 106 traversing the drivable region 110 toward the intersection 114. The object 108 can be stopped or moving. For example, the object 108 can be moving toward the intersection 114 with a decreasing velocity, remaining stopped in the drivable region 110, moving in a direction away from the intersection 114 diagonally toward the non-drivable region 112 to parallel park, or stopped at the non-drivable region 112 after having parallel parked.

At operation 116, the process can include determining top-down multi-channel image data. In some instances, top-down multi-channel image data can include images(s) representing the environment from a top-down perspective. For example, the image(s) can represent the environment at different times. The image(s) can include a bounding box representing a location and extent (e.g., length and width) of each of the vehicle and the object, at the indicated time. As discussed herein, each channel of the top-down multi-channel image data can represent different data about the environment, object(s), the vehicle, and the like. For example, a channel of the top-down multi-channel image data can include one or more of a vehicle layer, a pedestrian layer, a bike occupancy layer, a velocity layer, an acceleration layer, a vehicle lights layer, a map layer, a traffic light permissibility layer, or a static objects layer. Examples of top-down multi-channel image data are discussed in, for example, U.S. patent application Ser. No. 16/151,607 titled "Trajectory Prediction on Top-Down Scenes" and filed Oct. 4, 2018, which is incorporated by reference herein in its entirety for all purposes.

In some examples, the operation 116 can include determining data of an environment in addition to or instead of a top-down multi-channel image. The data can include a single image of a top-down multi-channel image, a vectorized top down image, a rasterized top down image, data determined by a one or more graph neural networks, and the like. In some cases, the top-down multi-channel image (or other environment data) can be input into a network (e.g., a convolutional neural network, a recurrent neural network, and/or a graph neural network), followed by other features being input into the network.

Examples 118, 120, and 122 illustrate example top-down multi-channel image data. That is, the images 118, 120, and 122 can represent the environment depicted in example 104 over time. For example, the image 118 can represent the environment at time TN-2, the image 120 can represent the environment at time TN-1, and the image 122 can represent the environment at time TN. For example, the image 118 can represent the environment 2 seconds in the past, the image 120 can represent the environment 1 second in the past, and the image 122 can represent the environment at the present time (e.g., time=N). The images 118, 120, and 122 can represent the environment at any period in time, and are not limited to the express times discussed herein.

As introduced above, each of the images 118, 120, and 122 can include a bounding box 124 representing a location and extent (e.g., length and width) of the vehicle 106 at the indicated time. Each of the images 118, 120, and 122 image 118 can include a bounding box 126 representing a location and extent (e.g., length and width) of the object 108 at the indicated time. As can be understood, each of the images 118, 120, and 122 can include any number of static objects (e.g., buildings, trees, curbs, sidewalks, map elements, etc.) or dynamic objects in the environment at any time, and is not limited to one object (e.g., the bounding box 126 representing the object 108), as discussed herein.

As can be understood, the bounding box 126 can be associated with different locations and/or movement information over time. Accordingly, the velocity information, the acceleration information, and/or the direction of movement associated with the object 108 in any of the images 118, 120, or 122 can be the same or different as for the other images. Further, the location associated with the bounding box 124 is updated throughout the images 118, 120, and 122 to illustrate a movement of the object 108 as the object 108 traverses the environment. In the image 118, the bounding box 126 can be located in the drivable region 110, and in a same lane as the bounding box 124. The bounding box 126 can be slowing down, stopped, or moving in a reverse direction, such as away from the intersection 114 and diagonally toward the non-drivable region 112. In the image 120, the bounding box 126 can be in a location further from the intersection than in the image 118. The bounding box 126 can be moving away from the intersection 114 and diagonally toward the non-drivable region 112. In the image 122, the bounding box 126 can be in a location further from the intersection than in the image 120. The bounding box 126 can be stopped and parked at the location being adjacent to the non-drivable region 112.

The top-down multi-channel image data can include data associated with the image(s), based on the map data and/or the sensor data associated with the environment at various times. For example, top-down multi-channel image data can include data associated with each of the images 118, 120, and 122, at the respective time associated with the image.

At operation 128, the process can include inputting the top-down multi-channel image data into a machine learned model. In some examples, the top-down multi-channel image data can include data associated with the images 118, 120, and 122. The machine learned model can be trained to determine probabilities associated with the vehicle 106 or objects in the environment, such as the object 108, based on top-down multi-channel image data. In some examples, the probabilities can be determined based on a type of object (e.g., pedestrian, vehicle, bicyclist, etc.) and/or one or more scenarios (e.g., highway, junction (e.g., road split, four-way intersection, etc.)) associated with the environment. In such examples, the machine learned model may be trained utilizing training data associated with different types of objects (e.g., object data) and/or different scenarios (e.g., scenario data, environmental data, (e.g., map data of the environment encoding portions such as lanes, reference lines, crosswalks, traffic devices and/or signs, and the like), etc.). Types of object(s) and/or scenario(s) can be provided to the machine learned model in the top-down multi-channel image data, such as data associated with the images 118, 120, and 122. For example, the images 118, 120, and 122 may represent the object 108 as a vehicle, and the scenario as a lane of the drivable region 110 in which the vehicle 106 and the object 108 are located. Based on a determination that the object 108 is being operated to maneuver into a parallel parking location, the machine learned model may determine the probabilities associated therewith.

At operation 130, the process can include receiving, from the machine learned model, a prediction probability of a disengagement event and/or that an object is an interacting object. In some examples, the prediction probability of the disengagement event can include a probability that a disengagement event will occur. In some examples, the interacting object probability that an object is an interacting object can include a probability that the object will interact with, and/or be encountered by, the vehicle.

For the purposes of visualization, the prediction probability of the disengagement event and/or that the object is the interacting object can be utilized to determine a progress bar associated with the bounding box of the vehicle. A size of the progress bar can be associated with the prediction probability of the disengagement event and/or that the object is the interacting object. The size of the progress bar associated with a higher prediction probability of a disengagement event can be larger than size of the progress bar associated with a lower prediction probability of a disengagement event. The progress bar can be associated with the bounding box, due to the environment being determined to include an interacting object. The progress bar can be omitted from the bounding box, based on the environment being determined to not include an interacting object.

An example 132 illustrates the prediction probability of the disengagement event and/or that the object is the interacting object. The prediction probability and/or the interacting object probability can be utilized to determine a progress bar 134 associated with the bounding box 124. The progress bar 134 can be displayed as part of the bounding box 124, with a level of progress associated with the progress bar being associated with a level of the prediction probability. The progress bar 134 can be associated with the bounding box 124, due to the environment being determined to include an interacting object. By way of example, the progress bar 134 associated with a symbol having a size that is less than half of a size of the bounding box 124 can be associated with the prediction probability being less than 50%. In another example, the progress bar 134 associated with a symbol having a size that is more than half of the size of the bounding box 124 can be associated with the prediction probability being greater than 50%. The symbol can be a box having a color (e.g. red) that is different from a color (e.g., green) of the bounding box 124. The progress bar 134 can be omitted from the bounding box 124, based on the environment being determined to not include an interacting object. The environment can be determined to include or not include an interacting object, based on the probability that the object is the interacting object.

At operation 136, the process can include controlling the vehicle based on the prediction probability of the disengagement event and/or that the object is the interacting object. For example, the prediction probability and the interacting object probability can be utilized to control an aspect of the vehicle. Based on prediction probability of the disengagement event and/or that the object is the interacting object the vehicle can be controlled, or be caused to be controlled, by a teleoperator or otherwise. The probability associated with interacting object can be used to plan a trajectory around the object, change thresholds associated with the object (e.g., in connection with other models), etc.

In some examples, the operation 136 can include communicating with a teleoperator to control the vehicle. If implemented in the context of a simulation, control of the vehicle during the simulation can be determined based on the prediction probability of the disengagement event and/or that the object is the interacting object. The simulation can succeed or fail based on the probabilities. The simulation can fail, based on the prediction probability of the disengagement event being above a probability threshold (e.g., predicting a disengagement event is likely to occur). The simulation can be utilized to determine a metric associated with the disengagement event. For example, the metric can include a location associated with the disengagement event, a location associated with aggregated disengagement events, statistics associated with the disengagement event and one or more other disengagement events, etc.

In other examples, the operation 136 can include updating a trajectory based on the prediction probability. For example, the operation can include generating one or more trajectories to navigate the vehicle away from the interacting object, and/or in a direction where a prediction probability indicates a lower probability associated with a disengagement event. In some examples, generating a trajectory in this matter can reduce incidents whereby the vehicle contacts a teleoperator for assistance operating the vehicle.

In some examples, the operation 136 can include controlling the vehicle to avoid the interacting object. The vehicle can be controlled based on information determined by a planning system of the vehicle. For example, if a specific object is found to be contributing to a likely future disengagement event, the vehicle can be controlled based on a trajectory determined by the planning system to avoid the object. The vehicle can be controlled to take a different route and/or increase a distance between the vehicle and the object. By refraining from calling and/or communicating with the teleoperator, a total number of times associated with the teleoperator being called, and/or communicated with, by a fleet of vehicles that includes the vehicle can be lowered. By lowering the total number of times that the teleoperator is called and/or communicated with, resources associated with the teleoperator can be conserved and/or freed up.

Therefore, and as described herein, sensor data and map data can be utilized to determine top-down multi-channel image data. The top-down multi-channel image data can be input into a machine learned model to determine a prediction probability. The prediction probability can be associated with a disengagement event and/or that an object is the interacting object. The probability can be determined by utilizing the machine learned model to analyze the top-down multi-channel image data. The vehicle can be controlled based on the prediction probability of the disengagement event and/or the prediction probability that the vehicle will interact with the object. The vehicle, otherwise being operated based on automated control, can be controlled by a teleoperator, based on the prediction probability. The teleoperator can smoothly and accurately control the vehicle, based on the prediction probability indicating the disengagement event and/or that the object is the interacting object.

Figure 2:
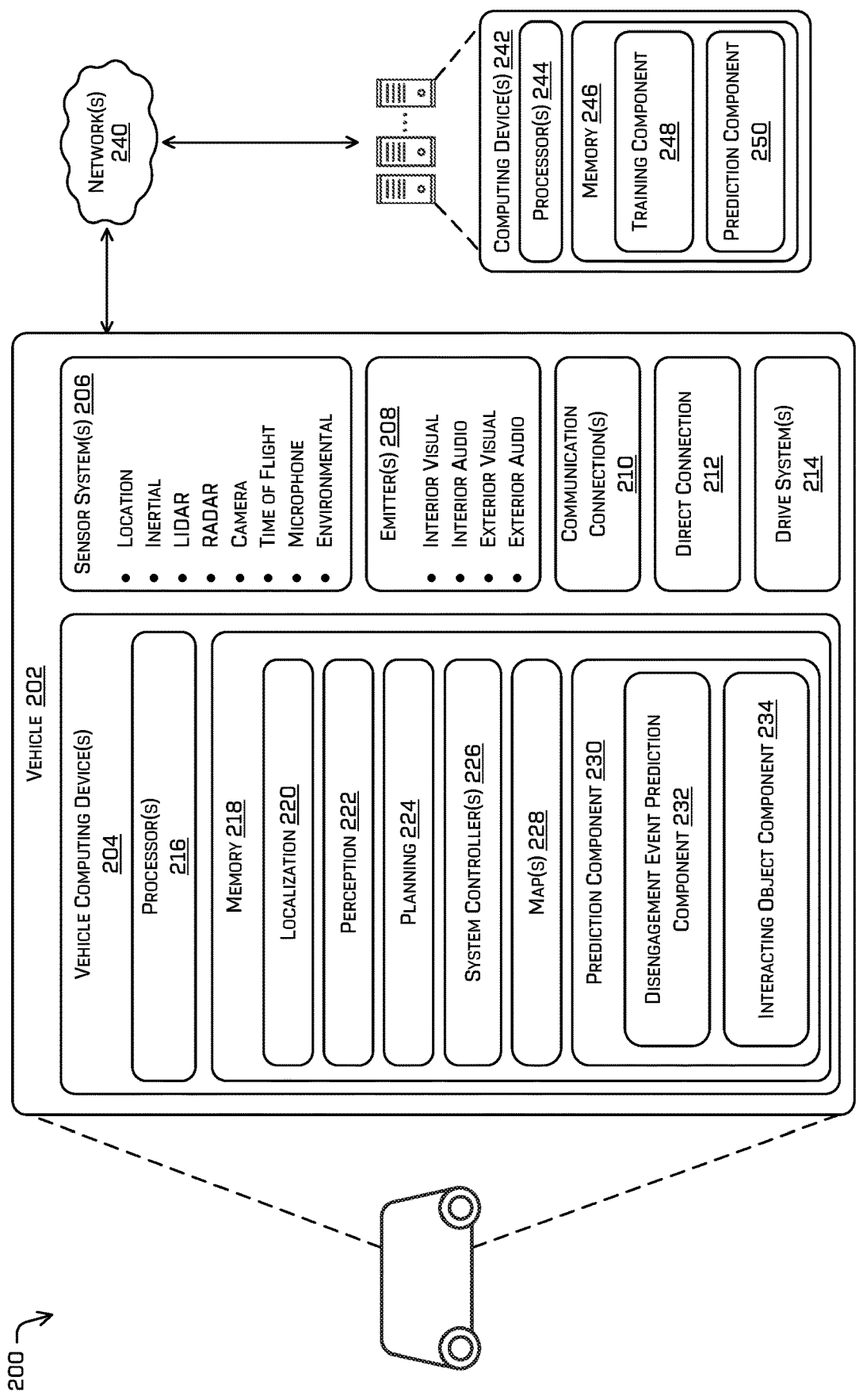
FIG. 2 depicts a block diagram of an example system for implementing the techniques described herein.

FIG. 2 depicts a block diagram of an example system 200 for implementing the techniques described herein. In at least one example, the system 200 can include a vehicle 202.

The vehicle 202 can include a vehicle computing device 204, one or more sensor systems 206, one or more emitters 208, one or more communication connections 210, at least one direct connection 212, and one or more drive systems 214.

The vehicle computing device 204 can include one or more processors 216 and memory 218 communicatively coupled with the one or more processors 216. In the illustrated example, the vehicle 202 is an autonomous vehicle; however, the vehicle 202 could be any other type of vehicle. In the illustrated example, the memory 218 of the vehicle computing device 204 stores a localization component 220, a perception component 222, a planning component 224, one or more system controllers 226, one or more maps 228, and a prediction component 230 comprising a disengagement event prediction component 232 and an interacting object component 234. Though depicted in FIG. 2 as residing in memory 218 for illustrative purposes, it is contemplated that the localization component 220, the perception component 222, the planning component 224, the one or more system controllers 226, the one or more maps 228, the prediction component 230, the disengagement event prediction component 232, and the interacting object component 234 can additionally, or alternatively, be accessible to the vehicle 202 (e.g., stored remotely).

In at least one example, the localization component 220 can include functionality to receive data from the sensor system(s) 206 to determine a position and/or orientation of the vehicle 202 (e.g., one or more of an x-, y-, z-position, roll, pitch, or yaw). For example, the localization component 220 can include and/or request/receive a map of an environment and can continuously determine a location and/or orientation of the autonomous vehicle within the map. In some instances, the localization component 220 can utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 220 can provide data to various components of the vehicle 202 to determine an initial position of an autonomous vehicle for generating a trajectory and/or for generating map data, as discussed herein.

In some instances, the perception component 222 can include functionality to perform object detection, segmentation, and/or classification. In some examples, the perception component 222 can provide processed sensor data that indicates a presence of an entity that is proximate to the vehicle 202 and/or a classification of the entity as an entity type (e.g., car, pedestrian, cyclist, animal, building, tree, road surface, curb, sidewalk, unknown, etc.). In additional or alternative examples, the perception component 222 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

In general, the planning component 224 can determine a path for the vehicle 202 to follow to traverse through an environment. For example, the planning component 224 can determine various routes and trajectories and various levels of detail. For example, the planning component 224 can determine a route (e.g., planned route) to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 224 can generate an instruction for guiding the autonomous vehicle along at least a portion of the route from the first location to the second location. In at least one example, the planning component 224 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 202 to navigate.

In at least one example, the vehicle computing device 204 can include one or more system controllers 226, which can be configured to control steering, propulsion, braking, safety, emitters, communication, and other systems of the vehicle 202. These system controller(s) 226 can communicate with and/or control corresponding systems of the drive system(s) 214 and/or other components of the vehicle 202.

The memory 218 can further include one or more maps 228 that can be used by the vehicle 202 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 228 can include at least one map (e.g., images and/or a mesh). In some examples, the vehicle 202 can be controlled based at least in part on the maps 228. That is, the maps 228 can be used in connection with the localization component 220, the perception component 222, and/or the planning component 224 to determine a location of the vehicle 202, identify objects in an environment, and/or generate routes and/or trajectories to navigate within an environment.

In some examples, the one or more maps 228 can be stored on a remote computing device(s) (such as the computing device(s) 242) accessible via network(s) 240. In some examples, multiple maps 228 can be stored based on, for example, a characteristic (e.g., type of entity, time of day, day of week, season of the year, etc.). Storing multiple maps 228 can have similar memory requirements, but increase the speed at which data in a map can be accessed.

In general, the prediction component 230 can generate predicted trajectories of objects in an environment. For example, the prediction component 230 can generate one or more predicted trajectories for vehicles, pedestrians, animals, and the like within a threshold distance from the vehicle 202. In some instances, the prediction component 230 can measure a trace of an object and generate a trajectory for the object based on observed and predicted behavior.

In some examples, the disengagement event prediction component 232 can include functionality to determine a prediction probability of a disengagement event. The disengagement event prediction component 232 can determine the prediction probability based on top-down multi-channel image data. The top-down multi-channel image data can include image data associated with images of an environment through which a vehicle is traveling. Examples of such images generated by the disengagement event prediction component 232 are shown in FIG. 1 as images 118, 120, and 122. The disengagement event prediction probability can be utilized to control the vehicle.

In some examples, the interacting object component 234, can include functionality to determine a prediction probability that an object is an interacting object, as discussed herein. The interacting object component can determine the prediction probability based on top-down multi-channel image data. The top-down multi-channel image data can include image data associated with images of an environment through which a vehicle is traveling. Examples of such images generated by the disengagement event prediction component 232 are shown in FIG. 1 as images 118, 120, and 122. The interacting object prediction probability can be utilized to control the vehicle.

In some instances, aspects of some or all of the components discussed herein can include any models, algorithms, and/or machine learning algorithms. For example, in some instances, the components in the memory 218 (and the memory 246, discussed below) can be implemented as a neural network.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

In at least one example, the sensor system(s) 206 can include LIDAR sensors, RADAR sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), time of flight sensors, microphones, wheel encoders, environment sensors (e.g., temperature sensors, humidity sensors, light sensors, pressure sensors, etc.), etc. The sensor system(s) 206 can include multiple instances of each of these or other types of sensors. For instance, the LIDAR sensors can include individual LIDAR sensors located at the corners, front, back, sides, and/or top of the vehicle 202. As another example, the camera sensors can include multiple cameras disposed at various locations about the exterior and/or interior of the vehicle 202. The sensor system(s) 206 can provide input to the vehicle computing device 204. Additionally or alternatively, the sensor system(s) 206 can send sensor data, via the one or more networks 240, to the one or more computing device(s) at a particular frequency, after a lapse of a predetermined period of time, in near real-time, etc.

The vehicle 202 can also include one or more emitters 208 for emitting light and/or sound, as described above. The emitters 208 in this example include interior audio and visual emitters to communicate with passengers of the vehicle 202. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 208 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 202 can also include one or more communication connection(s) 210 that enable communication between the vehicle 202 and one or more other local or remote computing device(s). For instance, the communication connection(s) 210 can facilitate communication with other local computing device(s) on the vehicle 202 and/or the drive system(s) 214. Also, the communication connection(s) 210 can allow the vehicle to communicate with other nearby computing device(s) (e.g., other nearby vehicles, traffic signals, etc.). The communications connection(s) 210 also enable the vehicle 202 to communicate with a remote teleoperations computing device or other remote services.

The communications connection(s) 210 can include physical and/or logical interfaces for connecting the vehicle computing device 204 to another computing device or a network, such as network(s) 240. For example, the communications connection(s) 210 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 202 can include one or more drive systems 214. In some examples, the vehicle 202 can have a single drive system 214. In at least one example, if the vehicle 202 has multiple drive systems 214, individual drive systems 214 can be positioned on opposite ends of the vehicle 202 (e.g., the front and the rear, etc.). In at least one example, the drive system(s) 214 can include one or more sensor systems to detect conditions of the drive system(s) 214 and/or the surroundings of the vehicle 202. By way of example and not limitation, the sensor system(s) can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, LIDAR sensors, RADAR sensors, etc. Some sensors, such as the wheel encoders can be unique to the drive system(s) 214. In some cases, the sensor system(s) on the drive system(s) 214 can overlap or supplement corresponding systems of the vehicle 202 (e.g., sensor system(s) 206).

The drive system(s) 214 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 214 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 214. Furthermore, the drive system(s) 214 also include one or more communication connection(s) that enable communication by the respective drive system with one or more other local or remote computing device(s).

In at least one example, the direct connection 212 can provide a physical interface to couple the one or more drive system(s) 214 with the body of the vehicle 202. For example, the direct connection 212 can allow the transfer of energy, fluids, air, data, etc. between the drive system(s) 214 and the vehicle. In some instances, the direct connection 212 can further releasably secure the drive system(s) 214 to the body of the vehicle 202.

In some examples, the vehicle 202 can send sensor data to one or more computing device(s) 242 via the network(s) 240. In some examples, the vehicle 202 can send raw sensor data to the computing device(s) 242. In other examples, the vehicle 202 can send processed sensor data and/or representations of sensor data to the computing device(s) 242. In some examples, the vehicle 202 can send sensor data to the computing device(s) 242 at a particular frequency, after a lapse of a predetermined period of time, in near real-time, etc. In some cases, the vehicle 202 can send sensor data (raw or processed) to the computing device(s) 242 as one or more log files.

The computing device(s) 242 can include processor(s) 244 and a memory 246 storing a training component 248 and a prediction component 250.

In some instances, the training component 248 can include functionality to train a machine learned model to output one or more predicted points, one or more confidence values associated with the one or more predicted points, or one or more heat maps including prediction probabilities. For example, the training component 248 can receive a set of images representing a top-down view of an environment. In some cases, the set of images can represent an object traversing through an environment for a period of time, such as 5 seconds, 7 seconds, 10 seconds, 20 seconds, and the like. At least a portion of the set of images can be used as an input to train the machine learned model, and at least a portion of the set of images can be used as ground truth information for training the machine learned model. As a non-limiting example, a first set (e.g., 3, 4, 5, or more) of a sequence of images can be input into the machine learned model. A second set of images (or trajectory information associated therefrom—e.g., by extracting positions and/or velocities from the images) in the sequence of images immediately preceding the first set can then be used as ground truth for training the model. Thus, by providing images of recorded trajectories where objects traverse an environment, the prediction components 230 and 250 can be trained to output predicted points, confidence values associated with the predicted points, or one or more heat maps including prediction probabilities, as discussed herein.

In some instances, the prediction component 250 can substantially correspond to the prediction component 230 and can include functionality to generate predicted trajectories of objects in an environment. For example, the prediction component 250 can generate one or more predicted trajectories for vehicles, pedestrians, animals, and the like within a threshold distance from the vehicle 202. In some instances, the prediction component 250 can measure a trace of an object and generate a trajectory for the object based on observed and predicted behavior.

The processor(s) 216 of the vehicle 202 and the processor(s) 244 of the computing device(s) 242 can be any suitable processor capable of executing instructions to process data and perform operations as described herein. By way of example and not limitation, the processor(s) 216 and 244 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 218 and 246 are examples of non-transitory computer-readable media. The memory 218 and 246 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 2 is illustrated as a distributed system, in alternative examples, components of the vehicle 202 can be associated with the computing device(s) 242 and/or components of the computing device(s) 242 can be associated with the vehicle 202. That is, the vehicle 202 can perform one or more of the functions associated with the computing device(s) 242, and vice versa.

Figure 3:
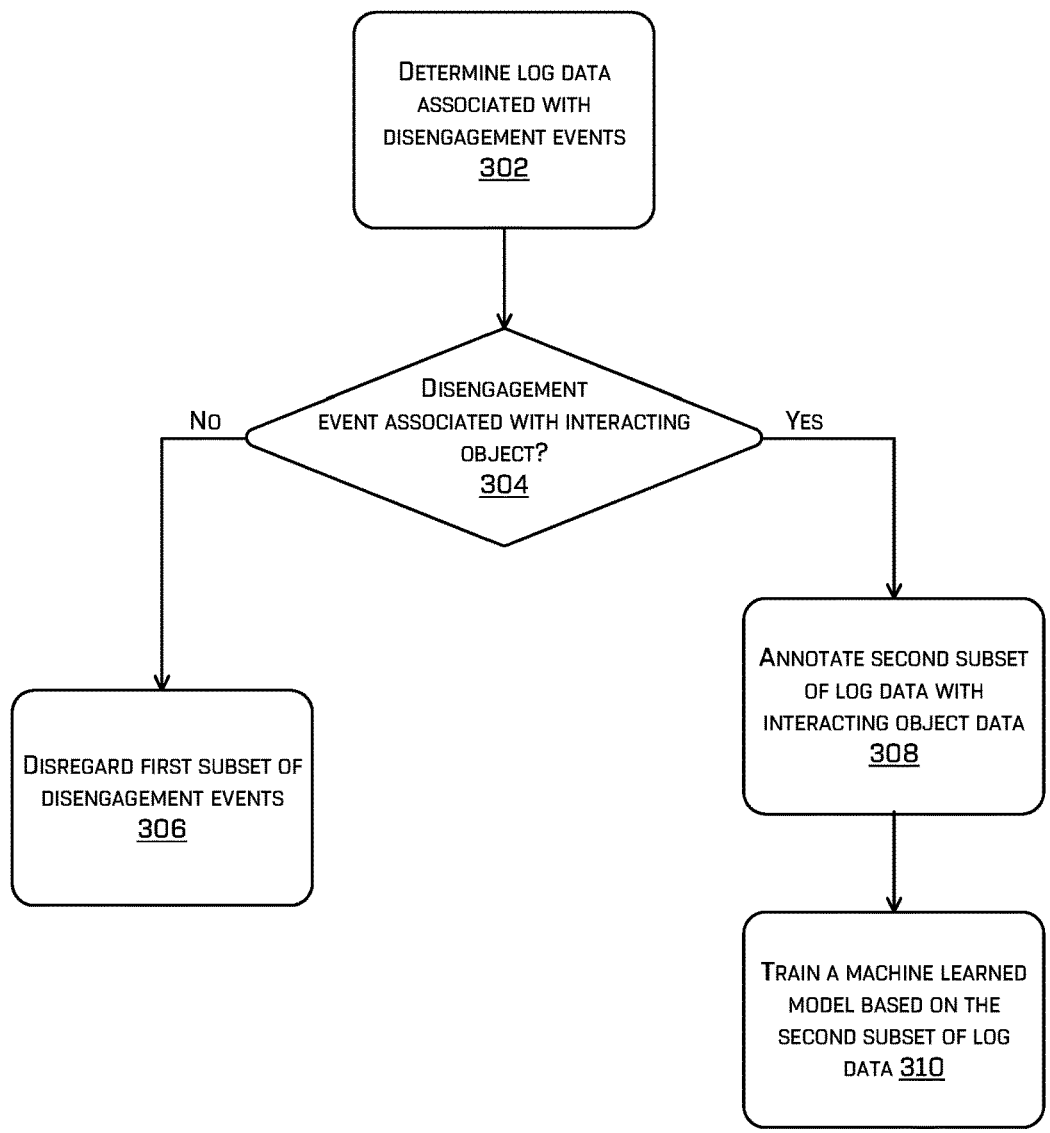
FIG. 3 depicts an example process for determining training data for training a machine learned model.

FIG. 3 depicts an example process 300 for determining training data for training a machine learned model. For example, some or all of the process 300 can be performed by one or more components in FIG. 2, as described herein. For example, some or all of the process 300 may be performed by the vehicle computing device(s) 204 and/or the computing device(s) 242.

At operation 302, the process may include determining log data associated with disengagement events. The log data can be associated with vehicles being operated in an environment. The log data can be utilized to predict probabilities associated with any number (e.g., one thousand, ten thousand, one hundred thousand, etc.) of disengagement events.

At operation 304, the process may include determining whether the disengagement events are associated with interacting objects. In some examples, log data associated with a disengagement event can be determined to be associated with an interacting object, based on a vehicle being determined to be travelling in the environment that includes an interacting object. Whether an object is an interacting object can be determined based on the object being determined to be in the environment associated with the vehicle. Additionally or alternatively, the object can be determined as an interacting object based on a location and/or predicted location of the object being associated with a predicted trajectory of the vehicle. For example, an interacting object can be determined based on a proximity of the object to the vehicle, a maneuver of the object, a classification of the object, a velocity or relative velocity of the object, a predicted trajectory of the object, a location of the object, and the like.

At operation 306, the process may include disregarding a first subset of disengagement events. In some examples, the first subset can include log data associated with the vehicle travelling through the environment that does not include interacting objects. The first subset can be disregarded based on the first subset being associated with data that is not related to the interacting objects. The first subset can be associated with software related data, such as code crashes, software events, or localization errors (e.g., an error in localization of the vehicle). The first subset can be unassociated with an object in the environment.

At operation 308, the process may include annotating a second subset of disengagement events with interacting object data. In some examples, the second subset can be associated with the vehicle travelling through the environment that does include an interacting object. The second subset can be annotated with the interacting object data and utilized in determinations of future disengagement events.

At operation 310, the process may include training a machine learned model based on the second subset of log data. The second subset can be input into the machined learned model. The machine learned model can be trained to analyze prediction probabilities of disengagement events, based on the second subset. The machine learned model can be utilized to control a vehicle. For example, the machine learned model being trained based on the second subset of log data can receive the prediction probability and/or the interacting object, and be utilized to control the vehicle 106, as discussed above in FIG. 1.

The machine learned model may be trained based on events including relevant events. For example, relevant events include events associated with human disengagements, a call and/or communication with a teleoperator, the vehicle getting stuck for a period of time, operations related to driving behavior associated with the vehicle, interactions between the vehicle and objects, issues (e.g., problems) with a perception system and/or a prediction system of the vehicle, and the like.

Therefore, and as described herein, the log data can be utilized to predict future behavior of objects interacting with a vehicle in an environment. The log data can be utilized to train the machine learned model to analyze future prediction probabilities associated with objects, such as an object remaining on a side of a road on which the vehicle is travelling, cutting in on the road, moving into a lane of the road shared by the vehicle, making a turn to enter the lane shared by the vehicle, or making a turn to exit the lane shared by the vehicle. The vehicle and object characteristics associated with the second subset can be utilized to train the machine learned model to identify features associated with relatively large numbers of disengagement events. The machine learned model can be trained to generalize the vehicle and object characteristics and to utilize those generalizations for predicting similar disengagement events in the future. By training the machine learned model based on the second subset, the machined learned model can be improved to more accurately identify disengagement events that were previously difficult to identify. The machine learned model can be trained to correctly identify disengagement events based on a type of data being input that would have previously resulted in incorrect results.

The machine learned model can also be retrained (as discussed below in connection with FIG. 4). In some examples, the results of problematic data input to the machine learned model can be fed back and provided as input to the machine learned model. The results that are output and fed back as input to the machine learned model can be utilized to further train the machine learned model and improve analysis associated with the problematic data. In some examples, by disregarding the first subset, disengagement events (e.g., nonrelevant events) that are not caused by interacting objects and that are not relevant for identifying future disengagement events associated with interacting objects, can be omitted as inputs to the machine learned mode. For example, nonrelevant events can include events associated with software related data, such as code crashes, or localization errors (e.g., an error in localization of the vehicle), and other events not associated with an object in the environment.

Figure 4:
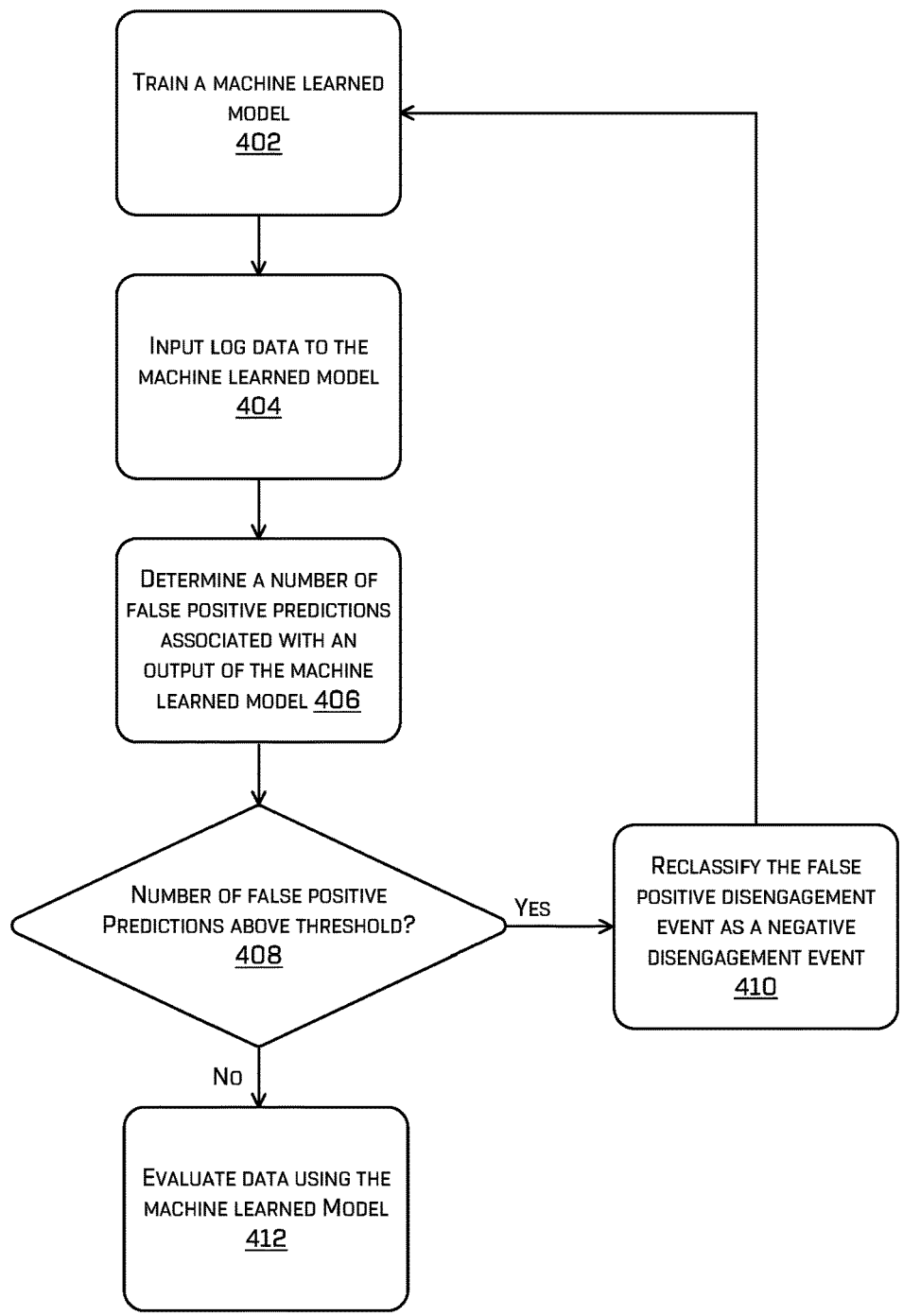
FIG. 4 depicts an example process for reclassifying false positive disengagement events as negative disengagement events.

FIG. 4 depicts an example process 400 for reclassifying false positive disengagement events as negative disengagement events. For example, some or all of the process 400 can be performed by one or more components in FIG. 2, as described herein. For example, some or all of the process 400 may be performed by the vehicle computing device(s) 204 and/or the computing device(s) 242.

At operation 402, the process may include training a machine learned model. The machine learned model can be trained based on log data. By training the machine learned model, log data input into the machine learned model can be utilized to output prediction probabilities utilized to control a vehicle.

At operation 404, the process may include inputting log data (e.g., determined as discussed in FIG. 3) to the machine learned model. The log data can include a subset of log data associated with a vehicle and an interacting object. A remaining subset of the log data not associated with an interacting object can be omitted from the log data utilized to train the machine learned model.

Each of training examples can be labeled (e.g., classified) as a positive training example, a negative training example, or a hard negative training example. The positive training example can be associated with a disengagement event, at a moment in time of the disengagement event. The negative training example and hard negative training example can be associated with an absence of a disengagement event. The negative training example can be associated with a time at which a disengagement event does not occur. The hard negative training example can be associated with any time that is less than a few seconds prior to the moment in time of the disengagement event. The times that are associated with the prediction probabilities being labeled, are not limited to the express times discussed herein. The hard negative training example can be associated with features associated with a vehicle or one or more objects in an environment that are similar to corresponding features for the positive training example. The corresponding features can be similar due to a time difference between the hard negative training example and the training example probability being small.

At operation 406, the process may include determining a number of false positive predictions associated with an output of the machine learned model. The machine learned model can output prediction probabilities of disengagement events. For example, a false positive is a prediction of a disengagement event by the machine learned model where the ground truth indicates that a disengagement event did not occur at that time (or within a threshold amount of time).

At operation 408, the process may include determining a number of false positive predictions above a threshold. In some examples, the false positive predictions can be compared and grouped with one another based on determining features for the false positive predictions being associated with a vehicle or one or more objects in an environment are similar. A number of false positive predictions with similar features for each of the groups can be compared to the threshold. Each of the groups of the false positive predictions that include a number of the false positive predictions above the threshold can be reclassified. Each of the groups of the false positive predictions that include a number of the false positive predictions at or below the threshold can be ignored.

In some cases, the false positive predictions can include a prediction associated with a disengagement as the vehicle enters an intersection. The vehicle may be travelling toward an intersection and be adjacent to a first object travelling in a same direction as the vehicle in an adjacent lane. A second object may be in a same lane as the vehicle and in the intersection ahead of the vehicle, and travelling in a same direction as the vehicle. A third object may be in the intersection, travelling in a parallel lane and in an opposite direction as the vehicle, and turning right onto a cross street. A disengagement may be predicted based on the vehicle being adjacent to the first object in the adjacent lane, and the intersection including the second object and the third object. However, the disengagement does not occur (e.g., there is no actual disengagement). For example, the false positive prediction is associated with an absence of a disengagement. The likelihood of collision between the vehicle and the first object, the second object, and/or the third object may be low, due to each of the objects travelling in a same direction as the vehicle or away from the trajectory of the vehicle.

In some cases, the false positive predictions can include a prediction associated with a disengagement as the vehicle is travelling toward an object that is parking. The object may be partially or entirely in a same lane as the vehicle, and turning left to cross an adjacent lane to park perpendicularly on an opposite side of a road. The disengagement may be predicted based on the vehicle travelling toward the object. However, the disengagement does not occur (e.g., there is no actual disengagement). For example, the false positive prediction is associated with an absence of a disengagement. The likelihood of collision between the vehicle and the object may be low, due to the object travelling out of the lane in which the vehicle is travelling.

At operation 410, the process may include reclassifying a false positive disengagement event as a negative disengagement event. By reclassifying the false positive predictions, predictions that are positive but that are not associated with actual disengagement events can be used to train the machine learned mode. After the training data set is updated in this matter, the model can be retrained in operation 402 to provide an updated machine learned model. Again, the model can be evaluated and the performance can be evaluated to improve the functioning of the model over time.

At operation 412, the process may include evaluating data using the machine learned model. The false positive predictions in each of the groups of the false positive predictions that include the number of the false positive predictions at or below the threshold can be evaluated using the machine learned model.

Therefore, and as described herein, the machine learned model can be trained based on false positive predictions in groups that include numbers of predictions at or below a threshold. False positive predictions in groups that include numbers of predictions above the threshold can be reclassified as negative predictions and fed back into the machine learned model.

Figure 5:
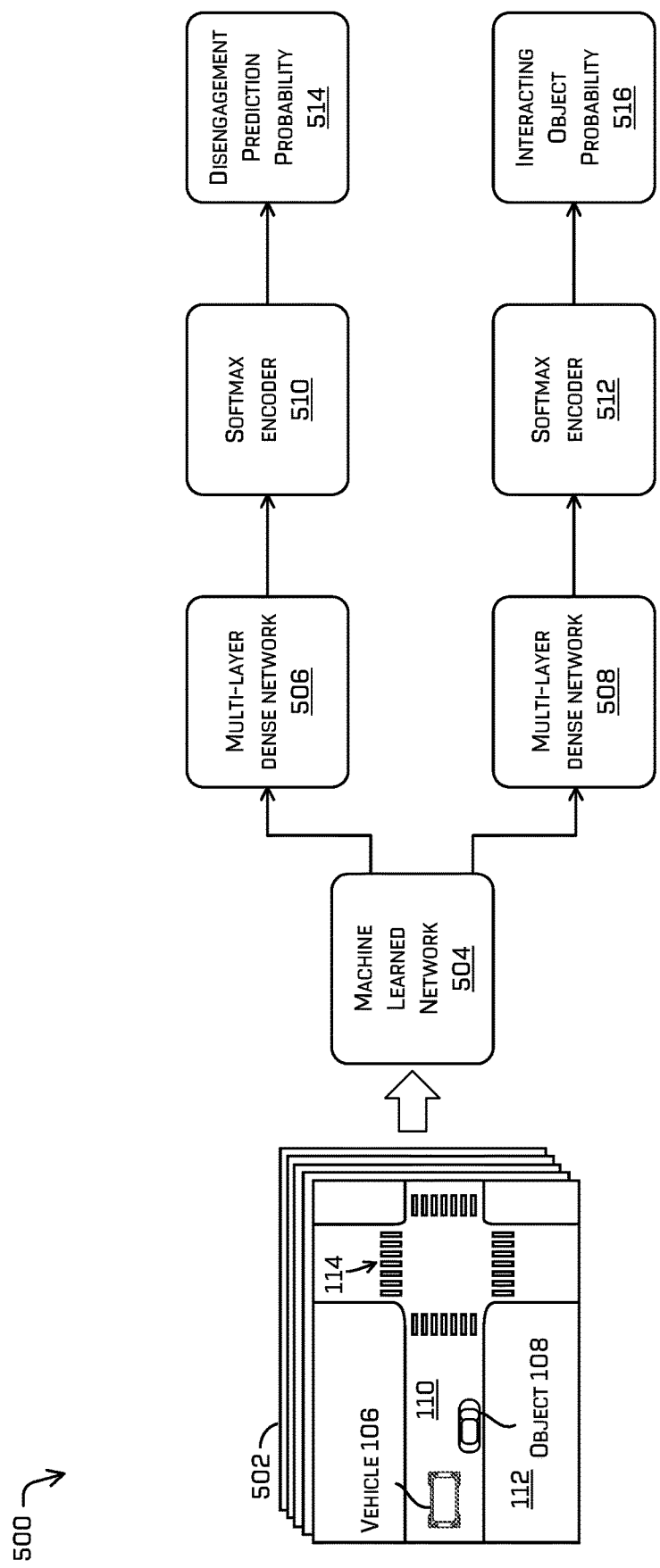
FIG. 5 depicts a block diagram of an example machine learned model to implement the techniques described herein.

FIG. 5 depicts a block diagram 500 of an example machine learned model to implement the techniques described herein.

In some examples, top-down multi-channel image data 502 can include images(s) representing the environment from a top-down perspective. The top-down multi-channel image data 502 can be implemented as the top-down multi-channel image data 104 in FIG. 1, as described herein. The image data 502 to be input into the prediction system can be represented by individual channels of a multichannel image. Each channel can represent different information about the object and/or the environment. For example, channels can represent, but are not limited to, one or more of: road network information (e.g., semantic labels indicating lanes, crosswalks, stop lines, lane dividers, stop signs, intersections, traffic lights, and the like), traffic light status (e.g., red light, yellow light, green light, etc.), a bounding box associated with the object, a velocity of the object in an x-direction and a y-direction, an acceleration of the object in an x-direction and a y-direction, a blinker status of the object (e.g., left-turn, right-turn, braking, reverse, hazards, no lights, etc.), and the like. In some examples, the channels can be input to the prediction system to generate at least one prediction probability associated with a disengagement event. In some examples, the image data 502 can be input directly to the prediction system (e.g., without generating channels based on the image) to generate the at least one prediction probability.

In some examples, the machine learned model 504 can be trained to determine the prediction probability and/or the interacting object probability utilizing supervised, semi-supervised, or unsupervised learned algorithms. In some examples, the machine learned model 504 can utilize clustering algorithms to determine the prediction probability and/or the interacting object probability. In at least one example, the machine learned model 504 can utilize k-means clustering algorithms. The prediction probability and/or the interacting object probability can be determined by utilize the machine learned model 504 to analyze the image data 502.

The machine learned model 504 can output data to multi-layer dense networks (e.g., multi-layer dense network 506 and multi-layer dense networks 508). The multi-layer dense network 506 can include data utilized to determine a disengagement prediction probability. The multi-layer dense network 508 can include data utilized to determine an interacting object probability.

The multi-layer dense network 506 can output data to a softmax encoder 510, which can output a disengagement prediction probability 514. The multi-layer dense network 508 can output data to a softmax encoder 512, which can output an interacting object probability 516.

In some cases, the disengagement prediction probability 514 associated with a vehicle can include a prediction probability for subclasses of disengagement events. For example, subclasses of disengagement events can include one or more of:

A cut-in subclass,
A traffic light junctions subclass,
A non-traffic light junctions subclass,
A crosswalk handling subclass,
A parked vehicle detection subclass,
A debris subclass,
A narrow handling subclass,
An oncoming vehicle in our lane subclass,
A passing blockage subclass,
A reversing vehicle subclass,
A parking vehicle subclass,
A construction zone subclass,
A u-turns/k-turns subclass,
A vehicle proximity subclass,
An unpredictable agents subclass,
A bicycle handling subclass,
A pedestrian handling subclass,
An unprotected left turns subclass,
A merging subclass,
A fail to yield subclass,
A fail to make forward progress subclass, or
A gesture interpretation subclass.

The softmax encoder 510 can encode and output, as encoded data, the data utilized to determine the disengagement prediction probability 514. The softmax encoder 512 can encode and output, as encoded data, the data utilized to determine the interacting object probability 516. In some examples, the interacting object probability 516 can include an interacting object probability associated with each object in an environment through which the vehicle is travelling.

Figure 6:
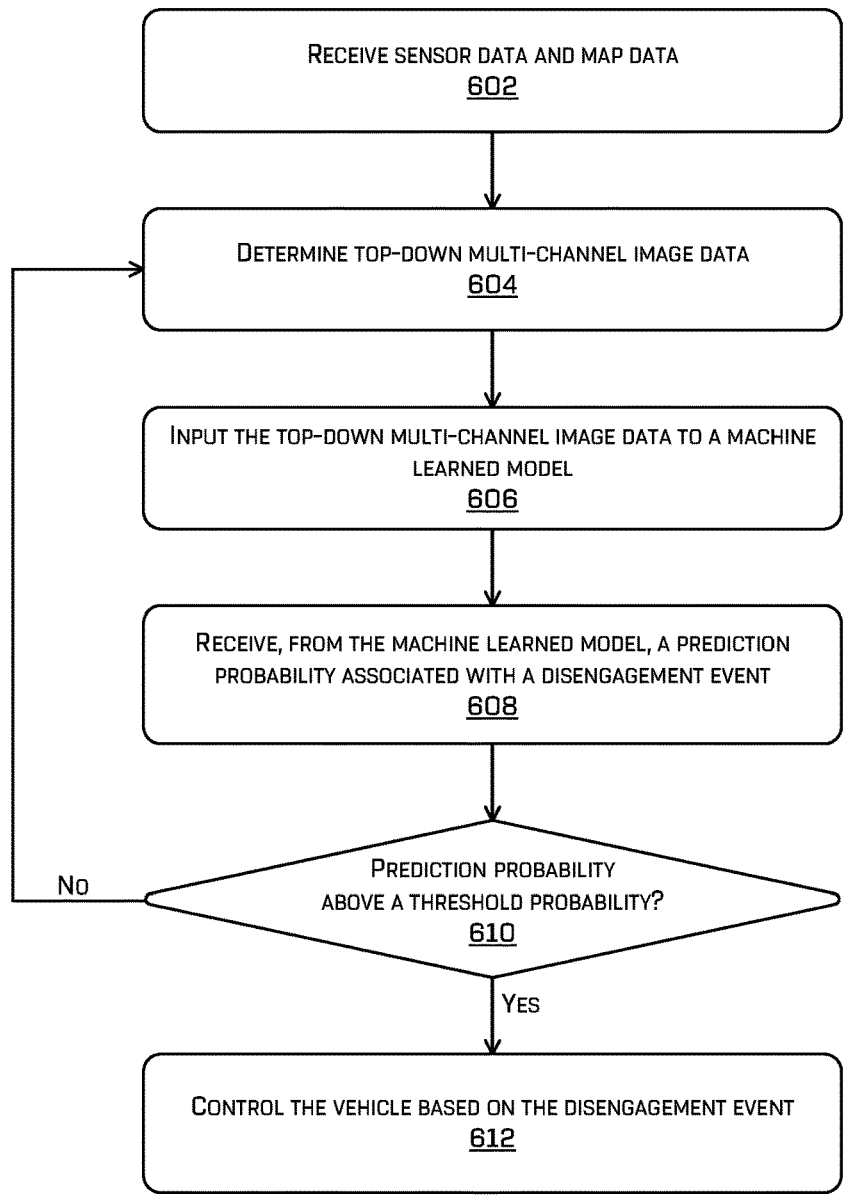
FIG. 6 depicts an example process for controlling a vehicle based on a disengagement event associated with a prediction probability associated with the disengagement event.

FIG. 6 is an example process 600 for determining a collision prediction and controlling a vehicle based at least in part on the collision prediction.

At operation 602, the process can include receiving sensor data and map data. The map data can be received by a vehicle (e.g., vehicle 106) localized in an environment. The sensor data can include a bounding box associated with an object (e.g., object 108) in the environment, classification information associated with the object 108, a location associated with the object, velocity and/or acceleration information associated with the object, and/or a direction of movement associated with the object.

At operation 604, the process can include determining top-down multi-channel image data. The top-down multi-channel image data can include images(s) representing the environment from a top-down perspective.

At operation 606, the process can include inputting the top-down multi-channel image data to a machine learned model. The top-down multi-channel image data can include data associated with images (e.g., images 118, 120, and 122). The machine learned model can be trained to determine probabilities associated with the vehicle or objects in the environment, based on top-down multi-channel image data. In some examples, the probabilities can be determined based on a type of object (e.g., pedestrian, vehicle, bicyclist, etc.) and/or one or more scenarios (e.g., highway, junction (e.g., road split, four-way intersection, etc.)) associated with the environment.

At operation 608, the process can include receiving, from the machine learned model, a prediction probability associated with a disengagement event. The prediction probability of the disengagement event can include a probability that a disengagement event will occur. The prediction probability can be received from the machine learned model along with an interacting object probability. The interacting object probability can be associated with an object is an interacting object and can include a probability that the object will interact with, and/or be encountered by, the vehicle.

At operation 610, the process can include determining whether the prediction probability is above a threshold probability. Based on the prediction probability of the disengagement event being above the threshold probability, the teleoperator can control, or cause the vehicle to be controlled. Based on the prediction probability of the disengagement event being below the threshold probability, the machine learned model can continue to input the top-down multi-channel image data.

At operation 612, the process can include controlling the vehicle based at least in part on the prediction probability and the interacting object probability. In some examples, the prediction probability and the interacting object probability can be utilized to control an aspect of the vehicle. The vehicle can be controlled, or be caused to be controlled, by the teleoperator, instead of by automated control. The vehicle can be controlled, or be caused to be controlled, by the teleoperator, based on a disengagement event.

In other examples, the vehicle can be controlled based on an action resulting in an avoidance of the disengagement event. The action utilized to control the vehicle can include refraining from calling and/or communicating with the teleoperator. Instead, the action can include controlling the vehicle to avoid the object. The vehicle can be controlled based on information determined by a planning system of the vehicle. For example, if a specific object is found to be contributing to a likely future disengagement event, the vehicle can be controlled based on a trajectory determined by the planning system to avoid the object. The vehicle can be controlled to take a different route and/or increase a distance between the vehicle and the object.

EXAMPLE CLAUSES

A: A system comprising: one or more processors; and one or more computer-readable media storing instructions executable by the one or more processors, wherein the instructions, when executed, cause the system to perform operations comprising: receiving sensor data from a sensor associated with an autonomous vehicle; determining that an object is represented by the sensor data; receiving map data of an environment associated with the autonomous vehicle; determining, based at least in part on the sensor data and the map data, top-down multi-channel image data representing the environment; inputting the top-down multi-channel image data to a machine learned model; receiving, from the machine learned model, a prediction probability associated with a disengagement event and an interacting object probability associated with the object wherein the disengagement event is an event that may result in autonomous driving of the autonomous vehicle being suspended; and controlling an aspect of autonomously driving the autonomous vehicle based at least in part on the prediction probability and the interacting object probability.

B: The system of paragraph A, wherein the prediction probability associated with the disengagement event is indicative of a probability for a safety driver to assume control over the autonomous vehicle.

C: The system of paragraph A or B, wherein the interacting object probability associated with the object is indicative of a probability of the disengagement event being based at least in part on the object.

D: The system of any of paragraphs A-C, wherein a channel of the top-down multi-channel image data comprises at least one of a vehicle layer, a pedestrian layer, a bike occupancy layer, a velocity layer, an acceleration layer, or a vehicle lights layer.

E: The system of any of paragraphs A-D, wherein the machine learned model is trained based at least in part on training data, the operations further comprising: identifying, based on log data, a first subset comprising first disengagement events based on nonrelevant events and a second subset comprising second disengagement events based on relevant events; and determining the training data based on the second subset.

F: A method comprising: receiving sensor data from a sensor associated with a vehicle; receiving map data of an environment associated with the vehicle; determining, based at least in part on the sensor data and the map data, environment data representing the environment; inputting the environment data to a machine learned model; receiving, from the machine learned model, a prediction probability associated with a disengagement event; and controlling an aspect of the vehicle based at least in part on the prediction probability.

G: The method of paragraph F, wherein the prediction probability associated with the disengagement event is based at least in part on prior disengagements of autonomous driving of a vehicle.

H: The method of paragraph F or G, further comprising: receiving, from the machine learned model, an interacting object probability associated with an object, wherein the interacting object probability associated with the object is indicative of a probability of the disengagement event being based at least in part on the object.

I: The method of any of paragraphs F-H, wherein the environment data includes multi-channel top-down image data and a channel of the top-down multi-channel image data comprises at least one of a vehicle layer, a pedestrian layer, a bike occupancy layer, a velocity layer, an acceleration layer, or a vehicle lights layer.

J: The method of any of paragraphs F-I, wherein the machine learned model is trained based at least in part on training data, the method further comprising: identifying, based on log data, a first subset comprising first disengagement events based on nonrelevant events and a second subset comprising second disengagement events based on relevant events; and determining the training data based on the second subset.

K: The method of paragraph J, wherein the first subset is associated with at least one of a software error, a localization error, or a disengagement event unassociated with an object in the environment.

L: The method of any of paragraphs F-K, the method further comprising: determining an object represented in the sensor data; representing the object in the environment data; receiving, from the machine learned model, interaction data between the vehicle and the object; and wherein controlling the aspect of the vehicle based at least in part on the interaction data.

M: The method of any of paragraphs F-L, wherein the machine learned model is trained based on training data, the method further comprising: determining the training data based on log data comprising a predicted disengagement event being classified as a positive type of disengagement event and associated with an absence of a disengagement event, the predicted disengagement event being labeled as a negative type of disengagement event based on the predicted disengagement event being associated with the absence of the disengagement event.

N: The method of any of paragraphs F-M, further comprising: simulating a vehicle controller associated with the vehicle; and determining a metric associated with the disengagement event, based on the simulating.

O: The method of any of paragraphs F-N, further comprising: sending a first signal to a teleoperator system, the first signal comprising a request that the teleoperator system control the vehicle based on the disengagement event; and controlling the vehicle based on a second signal received from the teleoperator system.

P: One or more non-transitory computer-readable media storing instructions that, when executed, cause one or more processors to perform operations comprising: receiving sensor data from a sensor associated with a vehicle; determining, based at least in part on the sensor data, environment data representing the environment; inputting the environment data to a machine learned model; receiving, from the machine learned model, a prediction probability associated with a disengagement event; and controlling an aspect of the vehicle based at least in part on the prediction probability.

Q: The one or more non-transitory computer-readable media of paragraph P, the operations further comprising: determining, based at least in part on the prediction probability, a trajectory for the vehicle to follow; and controlling the vehicle based at least in part on the trajectory.

R: The one or more non-transitory computer-readable media of paragraph P or Q, the operations further comprising: receiving, from the machine learned model, an interacting object probability associated with an object, wherein the interacting object probability associated with the object is indicative of a probability of the disengagement event being based at least in part on the object.

S: The one or more non-transitory computer-readable media of any of paragraphs P-R, wherein the environment data includes multi-channel top-down image data and a channel of the top-down multi-channel image data comprises at least one of a vehicle layer, a pedestrian layer, a bike occupancy layer, a velocity layer, an acceleration layer, or a vehicle lights layer.

T: The one or more non-transitory computer-readable media of any of paragraphs P-S, wherein the machine learned model is trained based at least in part on training data, the operations further comprising: identifying, based on log data, a first subset comprising first disengagement events based on nonrelevant events and a second subset comprising second disengagement events based on relevant events; and determining the training data based on the second subset.

While the example clauses described above are described with respect to one particular implementation, it should be understood that, in the context of this document, the content of the example clauses can also be implemented via a method, device, system, computer-readable medium, and/or another implementation. Additionally, any of examples A-T can be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more computer-readable media storing instructions executable by the one or more processors, wherein the instructions, when executed, cause the system to perform operations comprising:
receiving sensor data from a sensor associated with an autonomous vehicle;
determining that an object is represented by the sensor data;
receiving map data of an environment associated with the autonomous vehicle;
inputting, to a machine learned model and based at least in part on the sensor data and the map data, channels of a top-down multi-channel image, the channels representing at least one of road network information, a traffic light status, a bounding box associated with the object, a velocity of the object in two dimensions, an acceleration of the object in two dimensions, or a blinker status of the object;
receiving, from the machine learned model being utilized to analyze the top-down multi-channel image to identify a disengagement event prediction probability and an interacting object probability, the disengagement event prediction probability being associated with an event that results in autonomous driving of the autonomous vehicle being suspended by the autonomous vehicle, the interacting object probability being associated with an encounter between the autonomous vehicle and the object; and
controlling an aspect of autonomously driving the autonomous vehicle based at least in part on the disengagement event prediction probability and the interacting object probability.

2. The system of claim 1, wherein the disengagement event prediction probability is indicative of a probability for a safety driver to assume control over the autonomous vehicle.

3. The system of claim 1, wherein the interacting object probability associated with the object is indicative of a probability of the event being based at least in part on the object.

4. The system of claim 1, wherein a channel of top-down multi-channel image data including the top-down multi-channel image comprises at least one of a vehicle layer, a pedestrian layer, a bike occupancy layer, a velocity layer, an acceleration layer, or a vehicle lights layer.

5. A method comprising:
receiving sensor data from a sensor associated with an autonomous vehicle;
determining that an object is represented by the sensor data;
receiving map data of an environment associated with the autonomous vehicle;
inputting, based at least in part on the sensor data and the map data, channels of a top-down multi-channel image to a machine learned model, the channels representing at least one of road network information, a traffic light status, a bounding box associated with the object, a velocity of the object in two dimensions, an acceleration of the object in two dimensions, or a blinker status of the object;
receiving, from the machine learned model being utilized to analyze the top-down multi-channel image to identify a disengagement event prediction probability and an interacting object probability, the disengagement event prediction probability being associated with an event that results in autonomous driving of the autonomous vehicle being suspended by the autonomous vehicle, the interacting object probability being associated with an encounter between the autonomous vehicle and the object; and
controlling an aspect of autonomously driving the autonomous vehicle based at least in part on the disengagement event prediction probability and the interacting object probability.

6. The method of claim 5, wherein the disengagement event prediction probability is received based at least in part on combined data, the combined data including environment data and historical data, the historical data being associated with prior disengagements of autonomous driving of the autonomous vehicle.

7. The method of claim 5, further comprising:
wherein the interacting object probability associated with the object is indicative of a probability of the event being based at least in part on the object.

8. The method of claim 5, the method further comprising:
determining environment data based at least on part on the sensor data and the map data;
representing the object in the environment data; and
receiving, from the machine learned model, interaction data between the autonomous vehicle and the object, wherein controlling the aspect of the autonomous vehicle based at least in part on the interaction data.

9. The method of claim 5, wherein the machine learned model is trained based on training data, the method further comprising:
    determining the training data based on log data comprising a predicted disengagement event being classified as a positive type or a negative type, the positive type of disengagement event being associated with a disengagement event, the negative type of disengagement event being associated with an absence of the disengagement event.

10. The method of claim 5, further comprising:
    simulating a vehicle controller associated with the autonomous vehicle; and
    determining a metric associated with a disengagement event, based on the simulating.

11. The method of claim 5, further comprising:
    sending a first signal to a teleoperator system, the first signal comprising a request that the teleoperator system control the autonomous vehicle based on a disengagement event; and controlling the autonomous vehicle based on a second signal received from the teleoperator system.

12. One or more non-transitory computer-readable media storing instructions that, when executed, cause one or more processors to perform operations comprising:
    receiving sensor data from a sensor associated with an autonomous vehicle;
    determining that an object is represented by the sensor data;
    receiving map data of an environment associated with the autonomous vehicle;
    inputting, based at least in part on the sensor data and the map data, channels of a top-down multi-channel image to a machine learned model, the channels representing at least one of road network information, a traffic light status, a bounding box associated with the object, a velocity of the object in two dimensions, an acceleration of the object in two dimensions, or a blinker status of the object;
    receiving, from the machine learned model being utilized to analyze the top-down multi-channel image to identify a disengagement event prediction probability and an interacting object probability, the disengagement event prediction probability being associated with an event that results in autonomous driving of the autonomous vehicle being suspended by the autonomous vehicle, the interacting object probability being associated with an encounter between the autonomous vehicle and the object; and
    controlling an aspect of autonomously driving the autonomous vehicle based at least in part on the disengagement event prediction probability and the interacting object probability.

13. The one or more non-transitory computer-readable media of claim 12, the operations further comprising:
    determining, based at least in part on the disengagement event prediction probability, a trajectory for the autonomous vehicle to follow; and
    controlling the autonomous vehicle based at least in part on the trajectory.

14. The one or more non-transitory computer-readable media of claim 12,
    wherein the interacting object probability associated with the object is indicative of a probability of the event being based at least in part on the object.

15. The one or more non-transitory computer-readable media of claim 12, wherein the machine learned model is trained based at least in part on training data, the operations further comprising:
    identifying, based on log data, a first subset comprising first disengagement events based on nonrelevant events and a second subset comprising second disengagement events based on relevant events, the first subset being associated with at least one of a software error, a localization error, or a disengagement event unassociated with the object; and
    determining the training data based on the second subset.

16. The system of claim 1, wherein top-down multi-channel image data including the top-down multi-channel image includes first image data and second image data, the first image data being associated with a first time, the second image data being associated with a second time; and
    wherein the disengagement event prediction probability is received based at least in part on the top-down multi-channel image data that includes the first image data and the second image data.

17. The system of claim 1, wherein the disengagement event prediction probability is received based at least in part on combined data, the combined data including top-down multi-channel image data and other disengagement data, the top-down multi-channel image data including the top-down multi-channel image, the other disengagement data being associated with another disengagement for nonautonomous vehicle control by a safety driver.

18. The system of claim 1, wherein the event with which the disengagement event prediction probability is associated includes a disengagement event utilized, by the autonomous vehicle, to generate a first signal indicating a disengagement of the autonomous vehicle, the first signal being sent by the autonomous vehicle and to a teleoperator system, and
    wherein, based at least in part on the first signal, and on a second signal received from the teleoperator system, the disengagement event results in the autonomous vehicle being controlled utilizing teleoperator input.

19. The system of claim 1, wherein the instructions, when executed, cause the one or more processors to perform further operations comprising:
    determining a bar associated with another bounding box of the autonomous vehicle, the bar visually representing the disengagement event prediction probability or the interacting object probability of the autonomous vehicle, a size of the bar being larger for a relatively higher probability level than a relatively lower probability level; and
    causing presentation by a display screen, of the bar.

20. The one or more non-transitory computer-readable media of claim 12, wherein the disengagement event prediction probability is indicative of a probability for a safety driver to assume control over the autonomous vehicle.

* * * * *